United States Patent
Golin et al.

(10) Patent No.: US 9,010,096 B2
(45) Date of Patent: Apr. 21, 2015

(54) EXHAUST COMPONENT MOUNTING SYSTEM

(75) Inventors: Michael Golin, Dexter, MI (US); Dan Owen, Parma, MI (US); Tanay Muthay, Ann Arbor, MI (US); Keith Olivier, Jackson, MI (US)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 132 days.

(21) Appl. No.: 13/593,706

(22) Filed: Aug. 24, 2012

(65) Prior Publication Data

US 2014/0053539 A1 Feb. 27, 2014

(51) Int. Cl.
| | |
|---|---|
| *F01N 3/10* | (2006.01) |
| *F01N 13/00* | (2010.01) |
| *F01N 3/021* | (2006.01) |
| *F01N 3/20* | (2006.01) |
| *F01N 13/18* | (2010.01) |
| *F01N 3/035* | (2006.01) |

(52) U.S. Cl.
CPC .............. *F01N 13/017* (2014.06); *F01N 3/021* (2013.01); *F01N 3/103* (2013.01); *F01N 3/2066* (2013.01); *F01N 13/1838* (2013.01); *F01N 3/035* (2013.01); *F01N 2450/30* (2013.01); *F01N 2590/02* (2013.01); *F01N 2590/08* (2013.01); *Y02T 10/24* (2013.01)

(58) Field of Classification Search
USPC ........... 60/274, 286, 295, 299, 300, 301, 303, 60/311
See application file for complete search history.

(56) References Cited

U.S. PATENT DOCUMENTS

| | | | | |
|---|---|---|---|---|
| 3,247,665 | A * | 4/1966 | Behrens | 60/292 |
| 4,004,888 | A | 1/1977 | Musall et al. | |
| 5,082,479 | A | 1/1992 | Miller | |
| 5,228,891 | A * | 7/1993 | Adiletta | 55/484 |
| 5,578,277 | A * | 11/1996 | White et al. | 422/180 |
| 6,584,768 | B1 | 7/2003 | Hecker et al. | |
| 7,157,060 | B1 * | 1/2007 | Newburry | 422/177 |
| 7,550,024 | B2 | 6/2009 | Pawson et al. | |
| 7,581,389 | B2 * | 9/2009 | Crawley et al. | 60/297 |
| 8,062,602 | B2 * | 11/2011 | Roe et al. | 422/179 |
| 8,136,770 | B2 | 3/2012 | Beatty et al. | |
| 8,468,825 | B1 * | 6/2013 | Cone et al. | 60/614 |
| 8,516,802 | B2 * | 8/2013 | Kotrba et al. | 60/292 |
| 8,580,003 | B2 * | 11/2013 | Mitsuda | 55/318 |
| 2006/0067860 | A1 | 3/2006 | Faircloth, Jr. et al. | |
| 2006/0286013 | A1 | 12/2006 | Hovda et al. | |
| 2008/0060351 | A1 | 3/2008 | Pawson et al. | |
| 2008/0131335 | A1 | 6/2008 | Balk et al. | |
| 2010/0037871 | A1 | 2/2010 | Sauter et al. | |
| 2011/0023452 | A1 | 2/2011 | Gisslen et al. | |
| 2011/0314797 | A1 | 12/2011 | Moravec et al. | |

FOREIGN PATENT DOCUMENTS

| | | |
|---|---|---|
| KR | 10-0637767 | 10/2006 |
| KR | 10-2013-0007837 | 1/2013 |

* cited by examiner

*Primary Examiner* — Binh Q Tran
(74) *Attorney, Agent, or Firm* — Harness, Dickey & Pierce, P.L.C.

(57) ABSTRACT

An exhaust treatment system including an exhaust passage in communication with an engine that produces an exhaust. An exhaust canister is coupled to the exhaust passage, and the exhaust canister supports a plurality of exhaust treatment components therein for treating the exhaust, wherein exhaust canister is removable from the exhaust passage, and the exhaust treatment components are removable from the exhaust canister.

34 Claims, 4 Drawing Sheets

EXHAUST COMPONENT MOUNTING SYSTEM

FIELD

The present disclosure relates to an exhaust component mounting system.

BACKGROUND

This section provides background information related to the present disclosure which is not necessarily prior art.

Combustion engines are known to produce emissions that may be harmful to the environment. In an effort to decrease the environmental impact that an engine may have, exhaust aftertreatment systems have undergone comprehensive evaluation and development. Various components that assist in treating engine emission include oxidation and reduction catalysts that chemically react with the exhaust gases to produce less harmful emissions. Dependent on the size of the engine application, however, the cost of these components can increase greatly. In this regard, larger engine applications such as locomotive, marine, and large horsepower stationary applications can produce substantially more exhaust emissions than, for example, a tractor trailer engine application. The exhaust aftertreatment systems, therefore, are generally larger in scale to satisfactorily reduce the harmful emissions produced by these large-scale applications. As the scale of the aftertreatment system increases, however, the cost to produce, install, and service such as system increases greatly. It is desirable, therefore, to produce an exhaust aftertreatment system that is more conventional in scale, while still being able to reduce the effects of harmful emissions emitted by large engine applications.

SUMMARY

This section provides a general summary of the disclosure, and is not a comprehensive disclosure of its full scope or all of its features.

The present disclosure provides an exhaust treatment system including an exhaust passage in communication with an engine that produces an exhaust. An exhaust canister is coupled to the exhaust passage, and the exhaust canister supports a plurality of exhaust treatment components therein for treating the exhaust, wherein the exhaust canister is removable from the exhaust passage, and the exhaust treatment components are removable from the exhaust canister.

The exhaust treatment components can be arranged in an array in the canister.

The exhaust passage may define a flow direction, and the exhaust canister is removable from the exhaust passage in a direction orthogonal to the flow direction, while the exhaust treatment components are removable from the exhaust canister in a direction co-axial with the flow direction.

The exhaust treatment components are each at least one component selected from the group consisting of oxidation catalysts (DOC), particulate filters (DPF), and selective catalytic reduction catalysts (SCR).

The exhaust treatment components also may include at least one of each of an oxidation catalyst (DOC), a particulate filter (DPF), and a selective catalytic reduction catalyst (SCR).

The exhaust treatment system may further include a burner upstream of the exhaust canister.

Furthermore, the exhaust treatment system may include at least one injector for providing an exhaust treatment fluid into the exhaust.

The exhaust treatment fluid can be a hydrocarbon exhaust treatment fluid and/or a urea exhaust treatment fluid.

The exhaust canister can include an inlet and an outlet each coupled to the exhaust passage, and a housing disposed between the inlet and the outlet, wherein the housing is removable from the exhaust passage.

The exhaust canister can be fixedly coupled to the inlet and the outlet by clamps.

The housing can include a plurality of shells disposed therein supported by at least one baffle.

Each of the shells can receive a cartridge that includes the exhaust treatment component.

Lastly, each cartridge can be fixedly secured to the shells by a clamp.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 4 is a cross-sectional view of the exhaust component mounting along line 4-4 of FIG. 3.

Corresponding reference numerals indicate corresponding parts throughout the several views of the drawings.

DETAILED DESCRIPTION

Example embodiments will now be described more fully with reference to the accompanying drawings.

Figure 1:
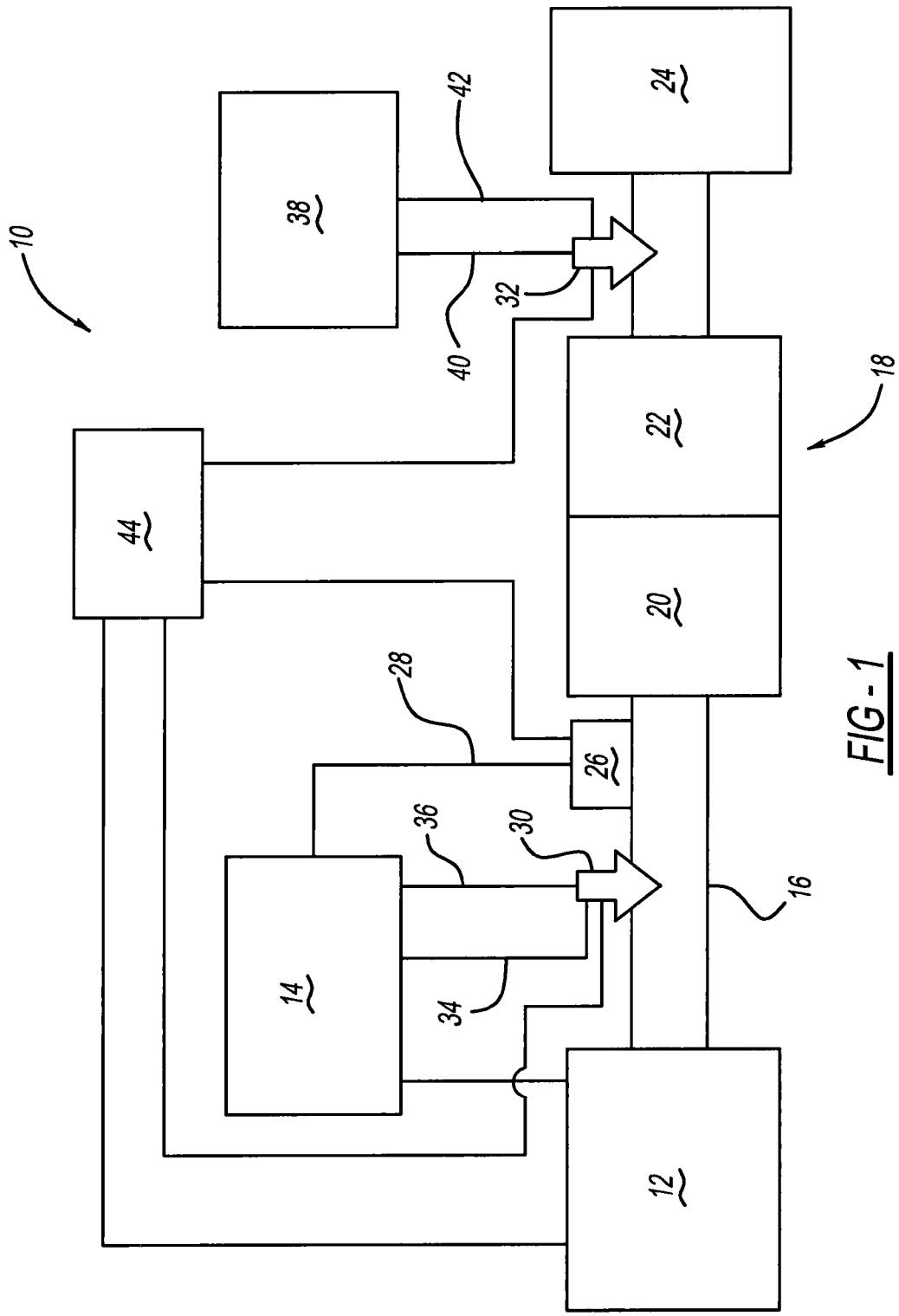
FIG. 1 is a schematic representation of an exhaust system according to a principle of the present disclosure.
Figure 2:
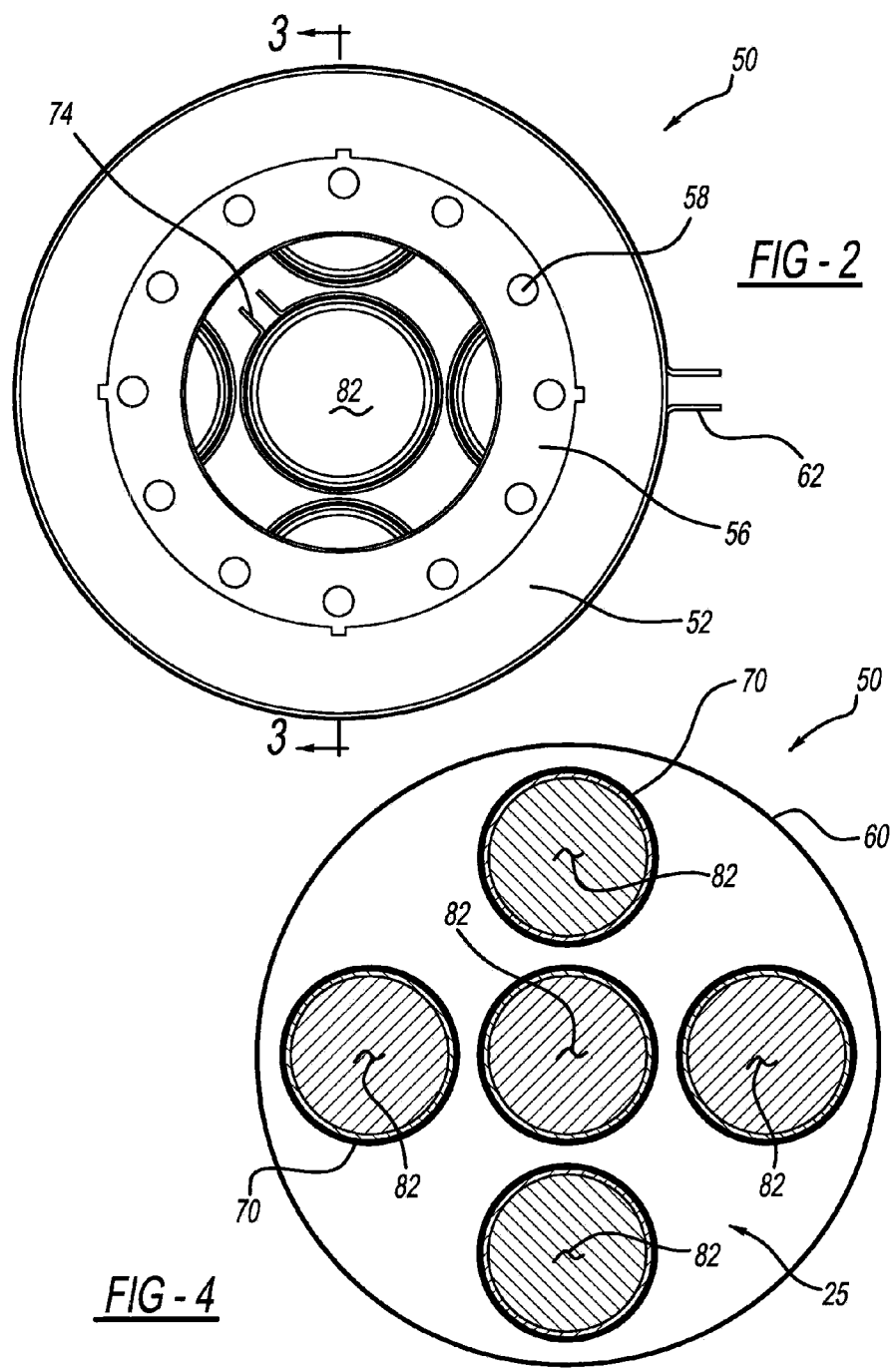
FIG. 2 is a front-perspective view of an exhaust component according to a principle of the present disclosure.
Figure 3:
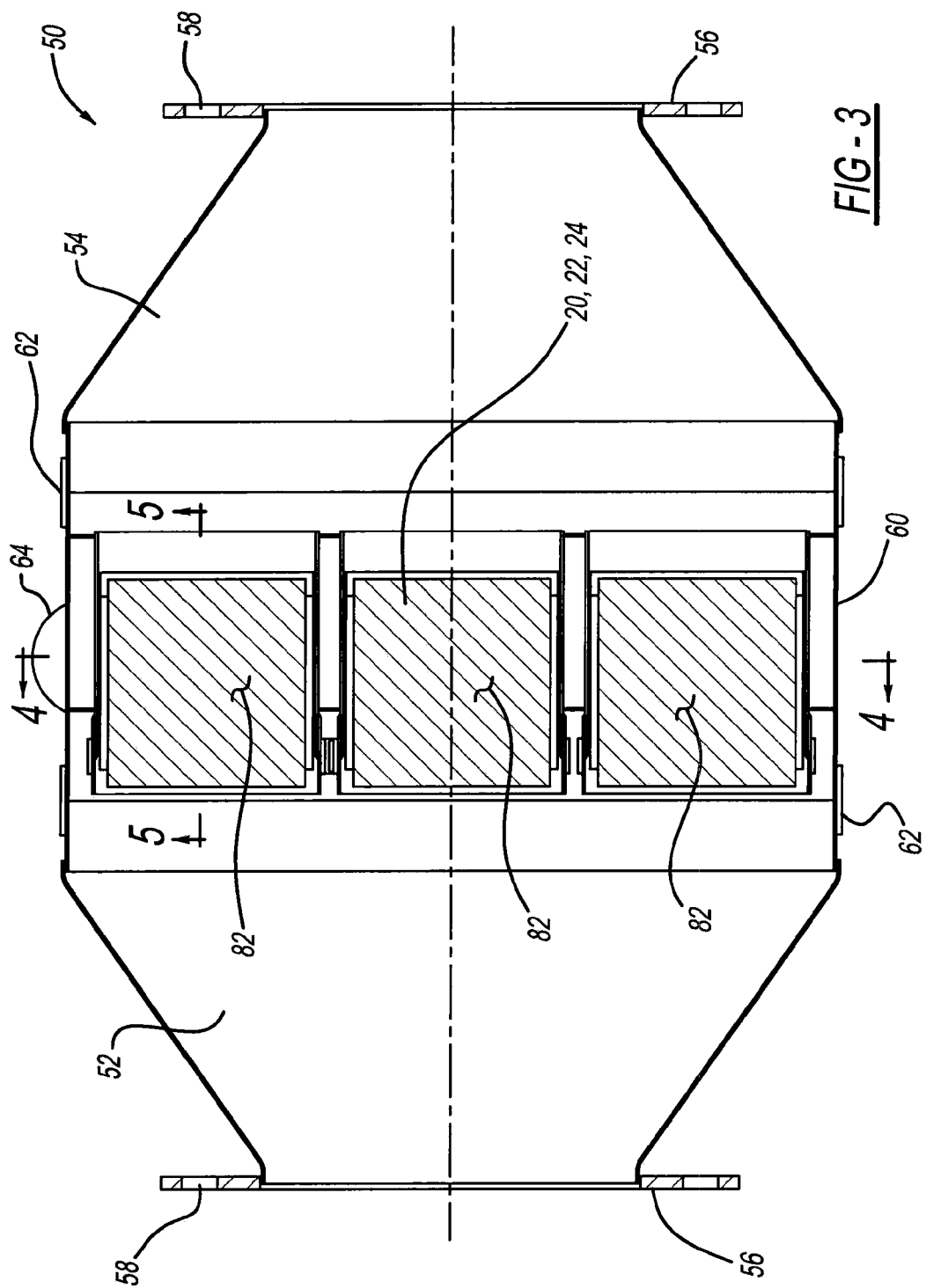
FIG. 3 is a cross-sectional view of the exhaust component along line 3-3 of FIG. 2.
Figure 5:
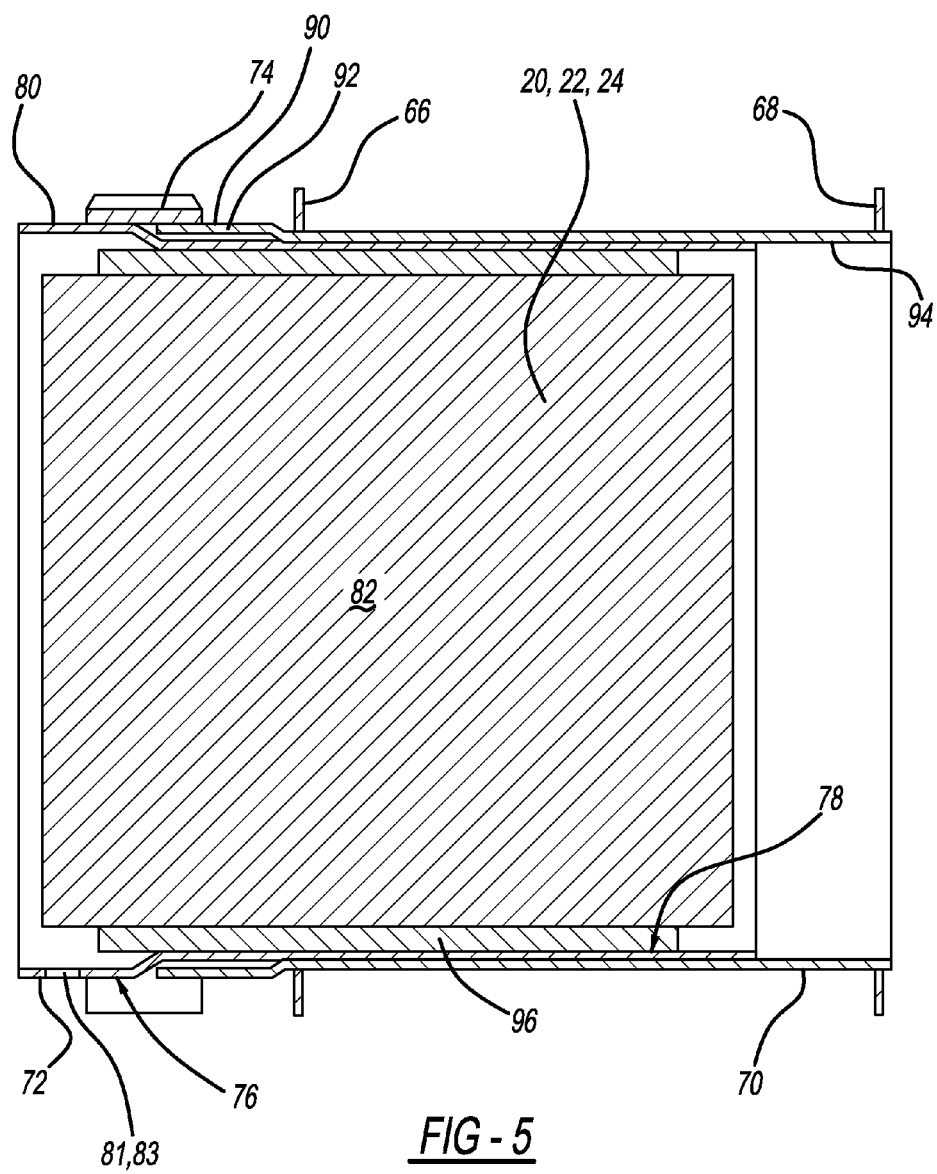
FIG. 5 is a cross-sectional view of a portion of an exhaust component mounting system along line 5-5 in FIG. 3.

FIG. 1 schematically illustrates an exhaust system 10 according to the present disclosure. Exhaust system 10 includes at least an engine 12 in communication with a fuel source 14 that, once consumed, will produce exhaust gases that are discharged into an exhaust passage 16 having an exhaust aftertreatment system 18. Downstream from engine 12 can be disposed a diesel oxidation catalyst (DOC) component 20, a diesel particulate filter (DPF) component 22, and a selective catalytic reduction (SCR) component 24. Exhaust aftertreatment system 18 can further include components such as a burner 26 to increase a temperature of the exhaust gases passing through exhaust passage 16. Increasing the temperature of the exhaust gas is favorable to achieve light-off of the catalyst in DOC and SCR components 20 and 24 in cold-weather conditions and upon start-up of engine 12, as well as initiate regeneration of DPF 22 when required. To provide fuel to burner 26, the burner can include an inlet line 28 in communication with fuel source 14.

DPF 24 may be desired as an exhaust treatment component to filter soot and any other particulate matters present in exhaust 14. When soot and the other particulate matter begins to clog the tiny pores (not shown) of the DPF 24, however, the DPF 24 can be cleaned by raising the temperature of the exhaust to burn off the excess soot and particulate matter from DPF 24. For the above reasons, burner 26 is preferably located upstream from each of DOC 20, SCR 24, and DPF 22. It should be understood, however, that DPF 22 may be located upstream of both DOC 20 and SCR 24 and include its own designated burner for regeneration purposes, while a second burner (not shown) can be located upstream of both DOC 20 and SCR 24. Another alternative is for each of DOC 20, SCR 24, and DPF 22 to include a designated burner.

To assist in reduction of the emissions produced by engine 12, exhaust aftertreatment system 18 can include injectors 30 and 32 for periodically injecting exhaust treatment fluids into the exhaust stream. As illustrated in FIG. 1, injector 30 can be located upstream of DOC 20 and is operable to inject a hydrocarbon exhaust treatment fluid that assists in at least reducing $NO_X$ in the exhaust stream. In this regard, injector 30 is in fluid communication with fuel source 14 by way of inlet line 34 to inject a hydrocarbon such as diesel fuel into the exhaust passage 16 upstream of DOC 20. Injector 30 can also be in communication with fuel source 14 via return line 36. Return line 36 allows for any hydrocarbon not injected into the exhaust stream to be returned to fuel source 14. Flow of hydrocarbon through inlet line 34, injector 30, and return line 36 also assists in cooling injector 30 so that injector 30 does not overheat. Other types of cooling, however, are contemplated. For example, injector 30 can be provided with a cooling jacket (not shown) where coolant can be passed through to cool injector 30.

Injector 32 can be used to inject an exhaust treatment fluid such as urea into exhaust passage 16 at a location upstream of SCR 24. Injector 30 is in communication with a reductant tank 38 via inlet line 40. Injector 32 also is in communication with tank 38 via return line 42. Return line 42 allows for any urea not injected into the exhaust stream to be returned to tank 38. Similar to injector 30, flow of urea through inlet line 40, injector 32, and return line 42 also assists in cooling injector 32 so that injector 32 does not overheat. Injector 32, however, can also be provided with a cooling jacket (not shown) in a manner similar to injector 30.

Large-scale diesel engines used in locomotives, marine applications, and stationary applications can have exhaust flow rates that exceed the capacity of a single injector. Accordingly, although only a single injector 30 is illustrated for hydrocarbon injector and only a single injector 32 is illustrated for urea injection, it should be understood that multiple injectors for both hydrocarbon and urea injection are contemplated by the present disclosure.

A controller 44 may be provided to control various features of exhaust system 18, including engine 12 and exhaust treatment system 18. Specifically, with respect to controlling elements of exhaust treatment system 18, controller 44 may be operable to control burner 26 and injectors 30 and 32. To control each of these elements, various sensors (not shown) may be disposed at positions throughout exhaust treatment system 18 to monitor, for example, exhaust temperature, NOx concentration, pressure, flow rate, exhaust treatment fluid temperature and pressure, and the like.

In large engine applications such as locomotive, marine, and stationary applications, the production of various exhaust treatment components may be cost prohibitive due to the scale necessary to effectively treat the large amount of exhaust produced during operation of engine 12. In this regard, the ceramic substrates of, for example, the DOC 20, DPF 22, and SCR 24 can be very expensive to produce. When produced in very large sizes, the DOC 20, DPF 22, and SCR 24 can be extremely expensive to produce. For this reason, instead of making large-scale exhaust treatment components commensurate in size with the large engine application, the exhaust flow can be divided into a plurality of exhaust passages 16 that each include a burner 26, DOC 20, DPF 22, and SCR 24 element that are more conventional in scale.

Alternatively, in lieu of dividing the exhaust flow into a plurality of exhaust passages 16 that use conventionally sized DOC 20, DPF 22, and SCR elements 24, and in lieu of producing large-scale exhaust treatment components 20, 22, and 24 that may be cost prohibitive, the exhaust treatment system 18 can include arrays of the exhaust system components. For example, referring to FIGS. 2-5, there is illustrated an exhaust system canister 50 that houses a plurality of exhaust treatment components 20, 22, or 24 arranged in an array 25. In the illustrated embodiment, the exhaust treatment components are DPFs 22, but the present disclosure should not be limited thereto. In this regard, it should be understood that that other exhaust treatment components such as DOCs 20 and SCRs 24 can be housed in an exhaust system canister 50 without departing from the scope of the present disclosure. Furthermore, the exhaust system canister 50 can house at least one of each of the exhaust system components 20, 22, and 24. That is, the exhaust system canister 50 can house at least one of each of the DOC 20, DPF 22, and the SCR 24 without departing from the scope of the present disclosure.

Exhaust canister 50 can include an inlet 52 and an outlet 54. As illustrated in FIGS. 2-5, each of inlet 52 and outlet 54 can be shaped like a cone, but the present disclosure should not be limited thereto. More specifically, inlet 52 and outlet 54 can be parallelpiped or any other shape known or desired by one skilled in the art. Regardless of the shape of inlet 52 and outlet 54, each of inlet 52 and outlet 54 can include a flange 56 including apertures 58 that receive bolts or screws to fixedly secure exhaust canister 50 to exhaust passage 16.

Between inlet 52 and outlet 54 is a housing 60 that supports the plurality of exhaust treatment devices 20, 22, or 24. As illustrated, housing 60 can be cylindrically shaped, but any shape known or desired by one skilled in the art is contemplated. For example, housing 60 can be cubical, parallelpiped, or any other shape known or desired. Regardless, according to the present disclosure, housing 60 is radially detachable (i.e., in a direction orthogonal to exhaust flow) from inlet 52 and outlet 54. In this regard, housing 60 is preferably clamped to both inlet 52 and outlet 54 through use of clamps 62. Because housing 60 is detachable from both inlet 52 and outlet 54, housing 60 can be removed from exhaust treatment system 18 when the exhaust treatment components supported therein need to be replaced, cleaned, or repaired.

Upon unlatching of clamps 62, housing 60 can be lifted from between inlet 52 and outlet 54 while both inlet 52 and outlet 54 remain fixedly coupled to exhaust passage 16. To grasp housing 60 to remove housing 60 from between inlet 52 and outlet 54, housing 60 can be provided with a handle or hook 64 that allows either a person or lift mechanism, respectively, to remove housing 60 from between inlet 52 and outlet 54. In this manner, it is easier to clean, replace, or repair exhaust system components 20, 22, or 24 supported within canister 50 because the entire canister 50 does not need to be removed from exhaust treatment system 18. Further, the use of clamps 62 also benefits the ease with which the exhaust system components 20, 22, or 24 can be repaired, replaced, or cleaned because housing 60 is not secured to inlet 52 and outlet 54 using bolts or some other type of fastener that is time-consuming to remove.

In addition to canister 60 being radially removable from inlet 52 and outlet 54, each exhaust treatment component 20, 22, or 24 is axially removable from housing 60. In this regard, within housing 60 is disposed a baffle system including a first baffle 66 adjacent inlet 52 and a second baffle 68 adjacent outlet 54. First and second baffles 66 and 68 support a plurality of shells 70 that each receive and support a respective exhaust treatment component 20, 22, or 24. Shells 70 are preferably fixed to each baffle 66 and 68 by welding, brazing, or some other attachment mechanism. In addition to being secured to shells 70, first and second baffles 66 and 68 are also preferably fixed to housing 60 by welding, brazing, or some other attachment mechanism. Although a pair of baffles 66 and 68 are used to support shells 70, it should be understood that only a single baffle 66 or more than a pair of baffles 66 and 68 is contemplated.

Each exhaust component 20, 22, or 24 can be housed in a cartridge 72 that is received by a respective shell 70. In this respect, cartridges 72 are slidably receivable in shells 70. Once cartridges 72 are installed in shells 70, cartridges 72 can be secured to shells 70 through the use of clamps 74 at a first end 76 adjacent inlet 52. Because second end 78 is not secured to shell 70 through use of clamps 74, an interface between second end 78 and shell 70 acts as a thermal slip joint that allows cartridges 72 and shells 70 to expand and contract during use of exhaust treatment system 18. In addition, similar to securing housing 60 to inlet 52 and outlet 54 using clamps 62 so that housing 60 is easily removable from exhaust aftertreatment system 18, by securing cartridges 72 to shells 70 using clamps 74 the exhaust treatment components 20, 22, or 24 are easily removable in the axial direction (i.e., a direction of exhaust flow) from housing 60. That is, rather than using bolts or some other type of fastener that can be time consuming to remove, the use of clamps 74 ensures that any exhaust treatment component 20, 22, or 24 housed in housing 60 can easily be removed and then cleaned, replaced, or repaired so that any engine 12 utilizing exhaust treatment system 18 does not undergo long periods of non-use when exhaust treatment system 18 is being serviced.

As illustrated in FIGS. 2-5, cartridge 72 and shell 70 can each include a flared edge 80 and 90, respectively. In this regard, first end 76 of cartridge 72 has a greater diameter than second end 78, and an inlet portion 92 of shell 70 has a greater diameter than an outlet portion 94. Flared edge 80 and 90 may have the same diameters such that contact therebetween prevents cartridge 72 from being improperly placed in shell 70. Also, because flared edges 80 and 90 have the same diameter, flared edges 80 and 90 when in close proximity to each other will form a substantially planar (when viewed in cross-section like that illustrated in FIG. 5) joint for clamp 74 to secure shell 70 and cartridge 72 together during use of exhaust treatment system 10.

In addition, flared edge 80 may include a grasping feature 81, which in the illustrated embodiment may be in the form of an opening 83 that allows a person's hand to grasp cartridge 72 and remove it from shell 70. Alternatively, grasping feature 81 can be defined by hook or handle (not shown) that allows a person to grasp cartridge 72 and remove it from shell 70.

Between cartridge 72 and exhaust treatment device 20, 22, or 24 may be disposed an insulating mat 96. Insulating mat 96 is operable to provide a thermal barrier between substrates 82 of DOC 20, DPF 22, or SCR 24 and cartridge 72 to keep heat in the cartridge 72 during operation of exhaust treatment system 18 so that sufficient catalytic reactions take place in DOC 20 and SCR 24, or to ensure that sufficient heat is maintained to assist in regenerating DPF 22.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An exhaust treatment system, comprising:
   a conduit including an exhaust passage in communication with an engine producing an exhaust;
   a housing coupled to said conduit, said housing supporting a plurality of exhaust treatment components therein for treating said exhaust,
   wherein said housing is separable from said conduit such that the conduit is interrupted and portions of the conduit are spaced apart from one another when the housing is removed, the exhaust treatment components being removable from said housing after said housing is separated from the conduit;
   a plurality of tubular shells positioned within and fixed to the housing; and
   removable cartridges, each cartridge including a cartridge tube containing an exhaust treatment component, each cartridge tube being axially slidably received within one of the shells, wherein each cartridge tube is asymmetrically shaped to restrict insertion of the cartridge tube within the shell when the exhaust treatment component is oriented in a reverse flow direction.

2. The exhaust treatment system of claim 1, wherein said exhaust treatment components are arranged in a parallel array in said housing.

3. The exhaust treatment system of claim 1, wherein said exhaust passage defines a flow direction, said housing being separable from said conduit in a direction orthogonal to said flow direction.

4. The exhaust treatment system of claim 3, wherein said exhaust treatment components are removable from said housing in a direction co-axial with said flow direction.

5. The exhaust treatment system of claim 1, wherein said exhaust treatment components are each at least one component selected from the group consisting of oxidation catalysts (DOC), particulate filters (DPF), and selective catalytic reduction catalysts (SCR).

6. The exhaust treatment system of claim 5, wherein said exhaust treatment components include at least one of each of an oxidation catalyst (DOC), a particulate filter (DPF), and a selective catalytic reduction catalyst (SCR).

7. The exhaust treatment system of claim 1, further comprising a burner upstream of the housing.

8. The exhaust treatment system of claim 1, further comprising at least one injector for providing an exhaust treatment fluid into said exhaust.

9. The exhaust treatment system of claim 8, wherein said exhaust treatment fluid is a hydrocarbon exhaust treatment fluid.

10. The exhaust treatment system of claim 1, wherein exhaust treatment fluid is a urea exhaust treatment fluid.

11. The exhaust treatment system of claim 1, wherein said housing includes an upstream end and a downstream end each coupled to the spaced apart portions of the conduit.

12. The exhaust treatment system of claim 11, wherein said housing is fixedly coupled to the spaced apart conduit portions by clamps.

13. The exhaust treatment system of claim 1, wherein each cartridge tube terminates at an end positioned outside of the shell and includes an outer diameter having a size substantially the same as an outer diameter of the shell.

14. The exhaust treatment system of claim 13, wherein the cartridge tube end positioned outside of the shell is devoid of a flange to minimize a spacing between adjacent cartridge tubes.

15. The exhaust treatment system of claim 1, wherein each cartridge is fixedly secured to said shells by a clamp.

16. The exhaust treatment system of claim 1, wherein said cartridge includes a first end and a second end, said first end having a diameter greater than a diameter of said second end.

17. The exhaust treatment system of claim 16, wherein said first end is fixedly secured to said shell, and an interface between said second end and said shell defines a thermal slip joint.

18. An exhaust treatment system, comprising:
a tubular housing adapted to be removably coupled to a conduit in receipt of exhaust from an engine;
tubular shells positioned within the housing and fixed thereto, the tubular shells including open first and second opposite ends, the tubular shells being positioned in parallel with one another within the housing; and
a cartridge removably positioned within a corresponding one of the tubular shells, each cartridge including a cartridge tube containing an exhaust treatment component;
a clamp coupling each cartridge to the corresponding tubular shell, wherein each cartridge tube axially extends beyond the first end of the corresponding tubular shell, the cartridge tubes and tubular shells each including outer surfaces overlapped by the clamp.

19. The exhaust treatment system of claim 18, wherein the conduit extends along a flow direction, the housing being separable from the conduit in a direction perpendicular to the flow direction.

20. The exhaust treatment system of claim 19, wherein decoupling and removal of the housing interrupts the conduit such that a gap exists between portions of the conduit.

21. The exhaust treatment system of claim 19, wherein the cartridge tubes are removable from the shells in a direction co-axial with the flow direction.

22. The exhaust system of claim 18, wherein each of the first open ends of the tubular shells are aligned along a common plane.

23. The exhaust system of claim 18, wherein the exhaust treatment component includes a catalyst wrapped by an insulation mat, the mat being positioned between the catalyst and an inside surface of the cartridge tube.

24. The exhaust system of claim 18, wherein each cartridge includes a geometric feature restricting the cartridge from entering the shell when oriented in a reverse flow direction.

25. The exhaust treatment system of claim 24, wherein the cartridge includes a first end and a second end, the first end having a diameter greater than a diameter of the second end.

26. The exhaust treatment system of claim 25, wherein the first end of the cartridge is fixedly secured to the shell, and an interface between the second end and the shell defines a thermal slip joint.

27. An exhaust treatment system, comprising:
a tubular inlet;
a tubular housing coupled to the inlet at a serviceable joint, the inlet and the housing adapted to receive exhaust from an engine;
tubular shells positioned within the housing and fixed thereto, the tubular shells including open first and second opposite ends, the tubular shells being positioned in parallel with one another within the housing; and
a cartridge removably positioned within each tubular shell, each cartridge including an exhaust treatment component, wherein each cartridge includes a geometric feature restricting the cartridge from entering the shell when oriented in a reverse flow direction, wherein the cartridge includes a first end and a second end, the first end having a diameter greater than a diameter of the second end.

28. The exhaust treatment system of claim 27, wherein the inlet is separable from the housing to allow removal of the cartridges from the shells when the inlet and the housing are spaced apart from one another.

29. The exhaust treatment system of claim 28, further including an exhaust conduit including the inlet and the housing, the inlet being removable from the conduit such that a gap exists between the conduit and the housing.

30. The exhaust treatment system of claim 27, wherein the exhaust treatment components are removable from the housing in a direction co-axial with an exhaust flow direction.

31. The exhaust system of claim 27, wherein each of the first open ends of the tubular shells are aligned along a common plane.

32. The exhaust system of claim 27, wherein each cartridge includes a tube containing a catalyst, the catalyst being wrapped by an insulation mat.

33. The exhaust treatment system of claim 27, wherein the first end of the cartridge is fixedly secured to the shell, and an interface between the second end and the shell defines a thermal slip joint.

34. The exhaust treatment system of claim 27, wherein each cartridge is devoid of a radially extending flange at its ends to allow the tubular shells to be positioned within close proximity of each other.

* * * * *